United States Patent
Li

(10) Patent No.: US 12,331,160 B2
(45) Date of Patent: Jun. 17, 2025

(54) METHOD FOR PREPARING ENVIRONMENTALLY FRIENDLY POLYAMIDE RESIN

(71) Applicant: CHENGDU 401 TECHNOLOGY CO., LTD, Sichuan (CN)

(72) Inventor: Yang Li, Shanghai (CN)

(73) Assignee: CHENGDU 401 TECHNOLOGY CO., LTD., Sichuan (CN)

( * ) Notice: Subject to any disclaimer, the term of this patent is extended or adjusted under 35 U.S.C. 154(b) by 733 days.

(21) Appl. No.: 17/611,562

(22) PCT Filed: May 14, 2020

(86) PCT No.: PCT/CN2020/090262
§ 371 (c)(1),
(2) Date: Nov. 15, 2021

(87) PCT Pub. No.: WO2020/233497
PCT Pub. Date: Nov. 26, 2020

(65) Prior Publication Data
US 2022/0227933 A1    Jul. 21, 2022

(30) Foreign Application Priority Data
May 17, 2019   (CN) .......................... 201910410581.9

(51) Int. Cl.
C08G 69/28  (2006.01)
C08G 69/26  (2006.01)
C08G 69/40  (2006.01)
C08G 69/44  (2006.01)

(52) U.S. Cl.
CPC ............. *C08G 69/28* (2013.01); *C08G 69/40* (2013.01); *C08G 69/44* (2013.01)

(58) Field of Classification Search
None
See application file for complete search history.

(56) References Cited

U.S. PATENT DOCUMENTS

| | | | | |
|---|---|---|---|---|
| 4,385,170 A | * | 5/1983 | Hirami | C08G 69/32 528/229 |
| 2019/0270885 A1 | * | 9/2019 | Kato | B29C 48/08 |

FOREIGN PATENT DOCUMENTS

| | | | |
|---|---|---|---|
| CA | 3075401 | 4/2019 | |
| CN | 101284906 | 10/2008 | |
| CN | 103102486 | 5/2013 | |
| CN | 105330848 | 2/2016 | |
| CN | 105829398 | 8/2016 | |
| CN | 108047444 | 5/2018 | |
| CN | 109354863 | 2/2019 | |
| EP | 0 413 71 | 12/1981 | |
| JP | H06-256503 A | 9/1994 | |
| JP | 2017-519082 | 7/2017 | |
| KR | 101813395 | 12/2017 | |
| SG | 180968 | 6/2012 | |
| WO | WO-2018088497 A1 * | 5/2018 | ............. A61L 29/06 |

OTHER PUBLICATIONS

Extended European Search Report issued in connection with EP Appl. Ser. No. 20809926.7 dated Nov. 28, 2022.
Japanese Office Action issued in connection with JP Appl. Ser. No. 2021-562051 dated Oct. 18, 2022.
Foreign Action other than Search Report for CN 202010419943.3 Dtd Oct. 12, 2020 (6 pages).
International Search Report and Written Opinion on PCT/CN2020/090262.

* cited by examiner

*Primary Examiner* — Ha S Nguyen
(74) *Attorney, Agent, or Firm* — FOLEY & LARDNER LLP

(57) ABSTRACT

An environment-friendly method for preparing polyamide resin, wherein the raw materials comprise by weight 5-60 parts of dibasic acid and 3-50 parts of diamine as polymeric monomers, and by weight 10-90 parts of polyamide of a reactive dispersion system; reactively dispersing the polymeric monomers into the polyamide dispersion system in molten state, and performing a polymerization reaction to obtain the polymer product. A salt formation process in water or ethanol does not occur during the entire process. The product is not affected by the temperature and pH value during the salt formation process, and has extremely stable quality. The problems of water consumption, energy consumption, time consumption, and unstable quality in traditional nylon salt production are solved.

7 Claims, No Drawings

US 12,331,160 B2

METHOD FOR PREPARING ENVIRONMENTALLY FRIENDLY POLYAMIDE RESIN

CROSS-REFERENCE TO RELATED PATENT APPLICATIONS

This application is a U.S. National Phase Application under 35 U.S.C. § 371 of International Application No. PCT/CN2020/090262, filed May 14, 2020, which claims the benefit of priority to CN 201910410581.9, filed on May 17, 2019, both of which are incorporated herein by reference in their entirety.

TECHNICAL FIELD

The present invention relates to the technical field of engineering plastics, in particular to an environment-friendly method for preparing polyamide resin.

BACKGROUND

Currently, the most commonly used nylon polymerization processes comprise nylon salt process and melt polymerization process. During the preparation of nylon salt, strong polar organic solvents such as ethanol or water are consumed, and key parameters such as temperature and pH value need to be controlled to ensure quality stability. The added water will volatilize after vaporization during the polycondensation process, which consumes a lot of energy.

Although the melt polymerization process does not require adding water as a solvent, the melt polymerization requires the addition of diamine when the dibasic acid is in the molten state. In this process, the dibasic acid must be melted first, and then the polymerization reaction is carried out. In order to avoid massive concentrated heat release when the dibasic acid and diamine are combined during the feeding process, which makes the temperature too high and causes decomposition, it is necessary to add the diamine slowly. This addition process may take several hours, which greatly limits the production efficiency of nylon in the melt polymerization process, and the reaction efficiency is low. On the other hand, the violent heat release during the combination of diamine and dibasic acid will cause a large loss of diamine which has a lower boiling point. In order to avoid monomer loss caused by volatilization, usually monomers with a higher boiling point are suitable. Such monomers generally have longer carbon chains, therefore, the melting point of the polyamide products thereof is generally lower. For monomers with smaller molecular weights, due to the strong volatility and the high density of amino groups or carboxyl groups, the mixing of monomers per unit mass releases more heat, and it is difficult to control the heat release during the mixing process of amino groups and carboxyl groups. Therefore, the traditional melt polymerization process is not suitable for the melt polymerization of monomeric amines with small molecular weights.

SUMMARY

In view of the above-mentioned problems in the traditional nylon salt process and melt polymerization process, the present invention provides an environment-friendly method for preparing polyamide resin. A salt formation process in water or ethanol does not occur during the entire process route. The product is not affected by the temperature and pH value during the salt formation process, and has extremely stable quality. The problems of water consumption, energy consumption, time consumption, and unstable quality in traditional nylon salt production are solved.

In order to achieve the above-mentioned purposes, the technical solution adopted by the present invention is:

A method for preparing polyamide resin, the raw materials comprise by weight 5-60 parts of dibasic acid and 3-50 parts of diamine as polymeric monomers, and by weight 10-90 parts of polyamide of a reactive dispersion system; reactively dispersing the polymeric monomers into the polyamide dispersion system in molten state, and performing a polymerization reaction to obtain the polymer product.

In the present invention, polyamide is used as a medium to disperse the monomeric dibasic acid and diamine. The dibasic acid and the diamine meet in the polyamide dispersion system to form a salt, a polymerization reaction occurs, and the monomeric dibasic acid and diamine can both react with the polyamide dispersion system, and can also react with the condensation polymer having low molecular weight generated during the polymerization process, which makes the entire system very uniform, and there will be no incompatibility of a certain component.

In the present invention, the process of reacting acid and amine in the monomers to form a salt and the process of dehydration polymerization are carried out in the polyamide dispersion system in molten state.

Under normal circumstances, the melting point of aliphatic monomers will be lower than the melting point of the polymer raw materials. If all materials are fed at one time and then heated and melted, the acid and amine will be melted and mixed before the polyamide is melted, and it is not conducive to controlling heat release. Therefore, preferably, the dibasic acid, the diamine and the polyamide cannot be put into the reaction system at the same time when the melting points of the monomer raw materials are lower than the melting point of the polyamide raw material.

When an aromatic acid is used as a monomer, as the melting point of the aromatic acid is higher than that of the polymer raw material, a strong shearing device such as an internal mixer can be used to feed all the materials. In addition to heating, the strong shearing of this type of dispersing device can also make the system heat up quickly, so the polyamide can be melted before the acid and amine release heat violently. With the presence of molted polymerized polyamide as a dispersion system, the heat released by the reaction of the aromatic acid and amine dissolved therein is easier to control. In this way, a reasonable sequence of material addition can be designed according to the characteristics of materials, equipment and the like.

In the dispersing step of polymeric monomers of the present invention, the highest temperature reached by the materials is higher than the melting point of the crystalline polyamide or the glass transition temperature of the amorphous polyamide, so that the polyamide can be melted. As polyamide itself has a high polarity, it is very helpful to disperse dibasic acid and diamine polar monomers after melting, thus avoiding using water as a solvent to prepare nylon salt. Although the polyamide itself has a relatively higher viscosity, both monomeric amine and acid can react with the polyamide to reduce the molecular weight of the polymer, thereby reducing the melting temperature and viscosity of the entire system, which is very conducive to the uniform mixing of monomers.

In order to avoid the loss of monomers by volatilization, the traditional melt polymerization process is usually suitable for monomers with higher boiling points. Such monomers usually have longer carbon chains, so the melting points of polyamide products thereof are usually lower. For monomers with smaller molecular weights, due to the strong volatility and the high density of amino groups or carboxyl groups, the mixing of monomers per unit mass releases more heat, and it is difficult to control the heat release during the mixing process of amino groups and carboxyl groups. Therefore, traditional melt polymerization is not suitable for polyamide. In the present invention, due to the addition of molten dispersion system of polyamide, the proportions of amino groups and carboxyl groups in the system are reduced, so that the heat release is reduced and easy to control. Therefore, the present invention shows more advantages in the melt polymerization of monomers with smaller molecular weights.

Further preferably, the highest temperature reached by the materials is higher than the melting point of the crystalline polyamide by 20° C. or more. The polyamide as the dispersion system needs to be fully melted. In order to improve the efficiency of the reaction and the solubility, it is preferable that the highest temperature reached by the materials during the dispersion process is higher than the melting point of polyamide by 20° C. or more. Otherwise, longer dispersion time and stronger shear are required to complete the dispersion, which will affects the efficiency.

The route of the present invention does not require special preparation of nylon salt in advance, so it is convenient to prepare copolymeric nylon by a way of mixing several dibasic acids or diamines and then feeding, so as to adjust the performance of the product in a wider range. It is even possible to add part of polyacid or polyamine into the monomers to make the product have a certain degree of crosslinking, thereby improving the temperature resistance of the product.

The method of the present invention is a general method for preparing polyamide, the dibasic acid, diamine and polyamide raw materials used can be arbitrarily selected according to performance requirements and cost factors.

The diamine is selected from at least one of aliphatic diamine comprising 2-20 carbon atoms and aromatic diamine.

Further preferably, the melting point of the polyamide product is higher than 230° C. Due to the addition of the polyamide molten dispersion system in the present invention, the proportions of amino groups and carboxyl groups in the system are reduced, so that the heat release is reduced and easy to control. Therefore, the present invention shows more advantages in the melt polymerization of monomers with smaller molecular weights. The PA56, PA66, and PA46 products prepared by the monomeric amines which are diamines comprising no more than 6 carbon atoms can all efficiently utilize the polymerization method of the present invention, and the melting points of these polyamide products all exceed 230° C.

The dibasic acid is selected from at least one of aliphatic dibasic acid comprising 2-20 carbon atoms and aromatic dibasic acid.

Preferably, the molar proportion of aromatic dibasic acid contained in the dibasic acid monomer is not less than 20%.

The introduction of aromatic monomer can greatly improve the temperature resistance of polyamide, wherein the aromatic dibasic acid has obvious cost advantage and are more widely used. However, the melting points of aromatic dibasic acids often approach or exceed the decomposition temperature, and the solubilities of aromatic dibasic acid in water and organic solvents are lower than that of aliphatic dibasic acids, and cannot be used in the traditional melt polymerization process with the acid melted first. The control of preparing nylon salt using aromatic dibasic acid is also more difficult than using aliphatic dibasic acid. The method of the present invention has a particularly prominent advantage in the polymerization of monomers containing aromatic dibasic acid to prepare semi-aromatic nylon. As polyamide melt has strong polarity and the dispersion is performed at a high temperature, the aromatic dibasic acid can be dissolved in the system after reacting sufficiently with the polyamide. Even if there are some aromatic dibasic acid that are not completely dissolved, the undissolved aromatic dibasic acid can be distributed very uniformly in the system in the form of very fine particles. After the polymerization reaction occurs, as the proportion of polyamide in the system increases, all the aromatic dibasic acid will eventually merge into the system and the system become homogeneous. A small amount of aromatic dibasic acid can also be dissolved in the molted aliphatic dibasic acid, but when the proportion of aromatic dibasic acid exceeds 20%, it will be very difficult to dissolve the aromatic dibasic acid in the traditional nylon salt method. In contrast, the advantages of the present invention become more prominent.

The polyamide of the reactive dispersion system of the present invention is selected from at least one of aliphatic polyamide, polyamide containing aromatic monomer, polyamide containing ether bond and polyamide containing ester bond.

The source of the polyamide dispersion system of the present invention can be very wide. In addition to conventional aliphatic polyamide and polyamide containing aromatic monomer, polyamide containing ether bond or ester bond can also be used as a dispersion media for the method of the present invention.

The molar ratio of the dibasic acid to the diamine in the present invention is 0.4-2:1. In order to obtain a final polymer with a sufficiently large molecular weight, it is necessary to ensure a relatively balanced ratio of amino and carboxylic acid functional groups in the final polymerization system. As the polyamide raw material of the present invention, amide oligomer with lower molecular weight can be used, and the ratio ranges of amino group content to carboxyl group content in the oligomer raw material can be larger. Therefore, it is necessary to adjust the ratio of acid raw material to amine raw material according to the ratio of amino group to carboxyl group in the oligomer raw material, so that the final ratio of acid to amine in the entire system is balanced, and a high molecular weight product is obtained. Therefore, in the present invention, the ratio of acid to amine in the three main raw materials can be adjusted between 0.4-2:1, allowing a wider source of the raw materials of the present invention. Amide oligomer which is very primary, and even oligomeric amide having only a small amount of repeating units can also be used as the polyamide raw material. The end groups of such amide oligomer can be mainly amino groups, mainly carboxyl groups, or amino groups and carboxyl groups with almost the same ratio, or the amide oligomer can even be primary polymer containing unpolymerized carboxylic acid or amine monomers. The source can be amide salt obtained by prepolymerisation only, or polyamide with low molecular weight obtained by simple ring-opening polymerization, or even the remaining materials from other polymerization processes or polymerization waste products that have not been completely reacted, which can also be used in the production of the present invention. Under these circumstances, the ratio of additional amine to additional acid in the raw material can be determined by determining the amine value and acid value of the oligomers. When the diamine or dibasic acid is excessive in the whole system, the method of the present invention can also be used to prepare various amino-terminated or carboxyl-terminated polyamides with different molecular weights. Polyamide with low molecular weight can be used as an important component in polyurethane and epoxy resin formulations.

The dibasic acid and diamine raw materials of the present invention can be the same as the monomers of the polyamide raw material to prepare homopolyamide, or different to prepare copolyamide.

In the method of the present invention, the sequence of adding monomers is relatively flexible, and the monomers can be added all at once or in batches. Preferably, in the dispersion step of the polymeric monomers, the addition of the monomeric dibasic acid does not precede the addition of the monomeric diamine.

For the metal materials commonly used in the preparation of reaction devices, the corrosiveness of acid far exceeds the corrosiveness of amine. Therefore, the addition of the monomeric acid not preceding the addition of the monomeric amine can avoid the formation of strong acid system and more conventional materials can be used to prepare the devices, reducing device investment.

As the dispersion system, too small amount of polyamide will greatly affect the efficiency of dispersion. Therefore, the proportion of the polyamide of the dispersion system in the raw materials of the present invention is not less than 10%.

Water is formed during the reaction of amine and acid to produce amide, and the equilibrium constant of the reaction can be as high as 400 or more. Therefore, the presence of water in the raw materials will not cause the polymerization reaction to fail, but the evaporation of water will consume a lot of heat, leading to an increase in energy consumption, so dried raw materials will be more economical, preferably the water content of the raw materials is not higher than 5%.

The beneficial effects of the present invention are:

1. Polyamide is used as a medium to disperse the monomeric dibasic acid and diamine. The dibasic acid and diamine form salt in the polyamide dispersion system instead of water, and the polymerization reaction occurs, so that the entire polymerization reaction is carried out under nearly homogeneous condition. Salt formation process in water or ethanol does not occur, which greatly simplifies the polymerization process, and avoids the production of waste liquid in the nylon salt preparation process. Theoretically, only water produced in the polycondensation process is the by-product, therefore the method is an environment-friendly method for synthesizing high-temperature resistant polymer.

2. A polyamide molten dispersion system is added in the present invention to reduce the proportions of amino groups and carboxyl groups in the system, so that the heat release is reduced and easy to control. Therefore, the present invention has more advantages in the melt polymerization of monomers with smaller molecular weights and is especially suitable for diamine monomer with small molecular weight, and can increase the speed of amine addition to the system. The method of the present invention has high reaction efficiency, the obtained polymer has a high melting point and good temperature resistance.

3. The product produced by the process route of the present invention is not affected by factors such as temperature and pH value during the preparation of nylon salt in the aqueous solution, and has good quality stability.

4. The polyamide raw material of the present invention has a wide range of sources, which can be finished polyamide available on the market, or prepolymer oligomer of polyamide, and defective product produced during the manufacturing process can also be used as the raw material, so basically, no waste is produced.

5. When the dibasic acid monomer contains an aromatic dibasic acid in a molar proportion of not less than 20%, the solubility and melting performance of the aromatic dibasic acid are far worse than that of the aliphatic dibasic acid, therefore, the preparation of nylon containing aromatic dibasic acid is also more difficult than the preparation of aliphatic nylon. Since the method of the present invention makes full use of the dispersion advantage of polyamide as a dispersion system, it is particularly suitable for the preparation of semi-aromatic high-temperature nylon containing aromatic dibasic acid.

EMBODIMENT

In order to describe the objective technical solutions of the present invention more clearly and in detail, the present invention will be further illustrated by the following related examples. The following examples are only used to specifically illustrate the implementation methods of the present invention, and are not used to limit the protection scope of the present invention.

Example 1

An environment-friendly method for preparing polyamide resin, the raw materials comprise by weight 5 parts of dibasic acid and 3 parts of diamine as polymeric monomers, and by weight 10 parts of polyamide of a reactive dispersion system; the process of the monomeric dibasic acid reacted with diamine by contact to form a salt and the process of dehydration polymerization were carried out in the polyamide dispersion system in molten state, and finally a polyamide product with a suitable molecular weight was produced.

Example 2

An environment-friendly method for preparing polyamide resin, the raw materials comprise by weight 60 parts of dibasic acid and 50 parts of diamine as polymeric monomers, and by weight 90 parts of polyamide of a reactive dispersion system; the polymeric monomers were reactively dispersed into the polyamide dispersion system in molten state, and a polymerization reaction was carried out to obtain a polymer product.

The dibasic acid and diamine polymeric monomers cannot be fed into the reaction system at the same time when the melting points of the monomer raw materials are lower than the melting point of the polyamide raw material.

In the step of dispersing the polymeric monomers, the highest temperature reached by the materials was higher than the glass transition temperature of the amorphous polyamide, so that the polyamide can be melted.

Example 3

An environment-friendly method for preparing polyamide resin, the raw materials comprise by weight 20 parts of dibasic acid and 15 parts of diamine as polymeric monomers, and by weight 12 parts of polyamide of a reactive dispersion system; the polymeric monomers were reactively dispersed into the polyamide dispersion system in molten state, and a polymerization reaction was carried out to obtain a polymer product.

In the step of dispersing the polymeric monomers, the highest temperature reached by the materials was higher than the melting point of the crystalline polyamide by 20° C. or more.

The melting point of the polyamide product was higher than 230° C.

The dibasic acid, diamine and polyamide cannot be fed into the reaction system at the same time when the melting points of the monomer raw materials are lower than the melting point of the polyamide raw material.

Example 4

An environment-friendly method for preparing polyamide resin, the raw materials comprise by weight 50 parts of dibasic acid and 20 parts of diamine as polymeric monomers, and by weight 20 parts of polyamide of a reactive dispersion system; the polymeric monomers were reactively dispersed into the polyamide dispersion system in molten state, and a polymerization reaction was carried out to obtain a polymer product.

The dibasic acid, diamine and polyamide cannot be fed into the reaction system at the same time when the melting points of the monomer raw materials are lower than the melting point of the polyamide raw material.

The highest temperature reached by the materials was higher than the melting point of the crystalline polyamide by 20° C. or more.

The melting point of the polyamide product was higher than 230° C.

The molar proportion of aromatic dibasic acid contained in the dibasic acid monomer was not less than 20%.

The polyamide of the reactive dispersion system was selected from at least one of aliphatic polyamide, polyamide containing aromatic monomer, polyamide containing ether bond and polyamide containing ester bond.

The molar ratio of the monomeric dibasic acid to the monomeric diamine was 0.4-2:1.

In the step of dispersing the polymeric monomers, the addition of the monomeric dibasic acid did not precede the addition of the monomeric diamine.

The proportion of the polyamide of the dispersion system in the raw materials was not less than 10%.

The method of the present invention is a general method for preparing polyamide, the used dibasic acid, diamine and polyamide raw materials can be arbitrarily selected according to performance requirements and cost factors.

The diamine was selected from at least one of aliphatic diamine comprising 2-20 carbon atoms and aromatic diamine, comprising butane diamine, pentane diamine, hexamethylene diamine, decamethylene diamine and alicyclic diamine, etc.

The dibasic acid was selected from at least one of aliphatic dibasic acid comprising 2-20 carbon atoms and aromatic dibasic acid.

The polyamide refers to at least one of aliphatic polyamide and semi-aromatic polyamide, which comprises polymers such as PA6, PA66, PA56, PA12T, PA10T, PA6T, PA6T and PAMXD6, etc.

Example 5

By weight, the raw materials comprise 18.3 parts of terephthalic acid and 12.8 parts of hexamethylene diamine as polymeric monomers, and 11.3 parts of PA6 resin;

Polymerization method: the formula amount of 113 g PA6 resin was placed into a nitrogen-protected autoclave equipped with a condensing device. After the autoclave was further purged with nitrogen for 3 times, the temperature was raised to 300° C. to melt the PA6. 182.6 g of terephthalic acid, 127.6 g of hexamethylene diamine, 0.15 g of benzoic acid, 0.2 g of catalyst and 0.2 g of antioxidant were added to the melted PA6, dispersed and reacted for 1 hour after the temperature was raised to 310° C. and under mechanical stirring and airtight conditions, and then the pressure was relieved slowly and the produced water was discharged. The reaction was then carried out under the conditions of 310° C. and 0.02 Mpa for 0.5 hour. The temperature was raised to 320° C. and the product was discharged to obtain a semi-aromatic polyamide PA6T/6 with a melting point of 290° C.

Example 6

By weight, the raw materials comprise 21.9 parts of adipic acid and 17.4 parts of hexamethylene diamine as polymeric monomers, and 22.6 parts of PA66 resin;

Polymerization method: the formula amount of 226 g PA66 resin was placed into a nitrogen-protected autoclave equipped with a condensing device. After the autoclave was further purged with nitrogen for 3 times, the temperature was raised to 290° C. to melt the PA66. 219 g of adipic acid, 174 g of hexamethylene diamine, 0.15 g of benzoic acid, 0.2 g of catalyst and 0.2 g of antioxidant were added, dispersed and reacted for 1 hour with the temperature kept at 280° C. and under mechanical stirring and airtight conditions, and then the pressure was relieved slowly and the produced water was discharged. The reaction was then carried out under the conditions of 280° C. and 0.02 Mpa for 0.5 hour. The temperature was raised to 290° C. and the product was discharged to obtain an aliphatic polyamide PA66 with a melting point of 266° C.

Example 7

By weight, the raw materials comprise 16.6 parts of terephthalic acid and 17.2 parts of decamethylene diamine as polymeric monomers, and 31.0 parts of PA10T resin;

Polymerization method: the formula amounts of 166 g terephthalic acid, 310 g PA10T resin and 172 g decamethylene diamine were added into an internal mixer together, and mixed at 330° C. for 15 minutes. After cooling, the melted and dispersed product was added into an autoclave, reacted at 320° C. for 30 minutes. The reaction was then carried out under the conditions of 310° C. and 0.02 Mpa for 15 minutes. The temperature was raised to 330° C. and the product was discharged to obtain a polyamide PA10T with a melting point of 310° C.

Example 8

By weight, the raw materials comprise 16.6 parts of terephthalic acid and 11.7 parts of hexamethylene diamine as polymeric monomers, and 20 parts of PA66 resin;

Polymerization method: the formula amounts of 166 g terephthalic acid and 200 g PA66 were added into an internal mixer together, and mixed at 310° C. for 15 minutes. After cooling, the melted and dispersed product was added into an anticorrosive-treated autoclave made of stainless steel and equipped with a condensing device. The temperature was raised to soften the product, and 117 g of hexamethylene diamine was added under stirring and dispersing, reacted at 300° C. for 30 minutes. The reaction was then carried out under the conditions of 310° C. and 0.02 Mpa for 15 minutes. The temperature was raised to 330° C. and the product was discharged to obtain a polyamide PA6T/66 with a melting point of 303° C.

Example 9

By weight, the raw materials comprise 14.6 parts of adipic acid and 11.7 parts of hexamethylene diamine as polymeric monomers, and 20 parts of PA66 resin;

Polymerization method: the formula amounts of 146 g adipic acid and 200 g PA66 resin were added into an autoclave together, the autoclave had not been subjected to an anticorrosive-treatment but is equipped with a condensing device. The temperature was raised to 290 degrees Celsius, and stirred for 1 hour to make the two raw materials melt, react and mix well. Then 117 g of hexamethylene diamine was added under stirring and dispersing, reacted at 280° C. for 1 hour. The reaction was then carried out under the conditions of 280° C. and 0.02 Mpa for 30 minutes. The temperature was raised to 290° C. and the product was discharged to obtain polyamide PA66 with a melting point of 266° C.

After the autoclave had been used for several times, rust marks appeared near the connector of the condensing device without anticorrosive-treatment. The rust entering the product caused black spots of foreign matter in the product, and the color turned yellow, indicating that if acid had to be dispersed into the polyamide first, corrosion-resistant stainless steel material must be selected as the device material.

Example 10

By weight, the raw materials comprise 16.6 parts of terephthalic acid and 17.2 parts of decamethylene diamine as polymeric monomers, and 31.0 parts of PA10T resin;

Polymerization method: the formula amounts of 310 g PA10T resin and 172 g decamethylene diamine were added into an internal mixer together, and mixed at 330° C. for 15 minutes. After cooling, the melted and dispersed product was added into an autoclave equipped with a condensing device, the temperature was raised to 320° C. to melt the product. 166 g of terephthalic acid was added, dispersed and reacted at 320° C. for 1.5 hours. The reaction was then carried out under the conditions of 310° C. and 0.02 Mpa for 15 minutes. The temperature was raised to 330° C. and the product was discharged to obtain a polyamide PA10T with a melting point of 308° C.

Example 11

By weight, the raw materials comprise 29.2 parts of adipic acid and 34.8 parts of hexamethylene diamine as polymeric monomers, and 50.0 parts of a PA66 prepolymer prepared in laboratory. The number average molecular weight of the prepolymer is about 500 Da, and through end group analysis, the carboxyl group content is 0.004 mol/g and the amino group content is 0.0002 mol/g., i.e., the prepolymer is a prepolymer whose end groups are basically carboxyl groups and starts to soften at 180° C. and melts completely at 220 degrees Celsius.

The steps of the method comprise:

500 g of the PA66 prepolymer in the formula was added into an autoclave equipped with a condensing device. After the autoclave was further purged with nitrogen for 3 times, the temperature was raised to 250° C. to melt the PA66 prepolymer. 348 g of hexamethylene diamine and 292 g of adipic acid were added respectively, dispersed and reacted for 1 hour under the conditions of 290° C. and mechanical stirring. The pressure was relieved slowly and the produced water was discharged. The reaction was then carried out under the conditions of 280° C. and 0.02 Mpa for 0.5 hour. The temperature was raised to 290° C. and the product was discharged to obtain an aliphatic polyamide PA66 with a melting point of 265° C., which is basically the same as the melting point in Example 6.

In this example, as the end groups of the PA66 prepolymer itself are mainly carboxyl groups, the proportion of dibasic acid in the raw materials is correspondingly reduced, and the molar ratio of dibasic acid to diamine is 0.67:1. If the amount of 50.0 parts of prepolymer was kept unchanged, the amount of adipic acid was reduced to 14.6 parts, then the amount of hexamethylene diamine needed would be 23.2 parts, and the molar ratio would be 0.5:1. If the proportion of adipic acid in the polymerization raw materials was further reduced, the molar ratio of dibasic acid to diamine would be further reduced. If a prepolymer whose end groups are basically amino groups was selected, the molar ratio of dibasic acid to diamine would be reversed, with the molar proportion of acid surpassing the molar proportion of amine.

Example 12

By weight, the raw materials comprise 22.5 parts of terephthalic acid and adipic acid, 17.4 parts of hexamethylene diamine as polymeric monomers, and 53.4 parts of PA66 resin;

By mole proportion, the dibasic acid comprises 20% of terephthalic acid and 80% of adipic acid;

Polymerization method: the formula amounts of 175 g adipic acid, 49 g terephthalic acid and 534 g PA66 were added into an autoclave together, the autoclave was made of stainless steel and equipped with a condensing device. After the autoclave was further purged with nitrogen for 3 times, the materials were dispersed and reacted for 1 hour under the conditions of airtight, 290° C. and mechanical stirring. Then 174 g of hexamethylene diamine was added, continued to react and disperse at 290° C. for 1 hour. The pressure was relieved slowly and the produced water was discharged. The reaction was then carried out under the conditions of 280° C. and 0.02 Mpa for 0.5 hour. The temperature was raised to 290° C. and the product was discharged to obtain an aliphatic polyamide PA66 with a melting point of 271° C.

Example 13

By weight, the raw materials comprise 16.6 parts of terephthalic acid and 11.7 parts of hexamethylene diamine as polymeric monomers, and 12 parts of PA66 resin;

Polymerization method: 166 g of terephthalic acid and 120 g of PA66 resin were mixed in an internal mixer at 320 degrees Celsius for 15 minutes to obtain a well mixed dispersion, which was cooled for later use. The obtained dispersion was added into an autoclave made of stainless steel and equipped with a condensing device. The temperature was raised to 300° C. to melt the dispersion, 117 g of hexamethylene diamine was added and stirred well, reacted at 320° C. for 1 hour. The reaction was then carried out under the conditions of 320° C. and 0.02 Mpa for 30 minutes. The temperature was raised to 340° C. and the product was discharged to obtain a polyamide PA6T/66 with a melting point up to 330° C.

Example 14

By weight, the raw materials comprise 14.6 parts of adipic acid and 11.7 parts of hexamethylene diamine as polymeric monomers, and 7 parts of PA66 resin;

Polymerization method: 146 g of monomeric adipic acid and 70 g of PA66 resin were added into an autoclave made of stainless steel and equipped with a condensing device. The temperature was raised to 200° C., stirred and dispersed for 2 hours, the PA66 resin did not melt and cannot form a uniform dispersion. 117 g of hexamethylene diamine was added dropwise, and the temperature was raised to 220° C. After 1 hour of reaction, the system was a melt containing unreacted PA66 particles, which could not be pumped out through the bottom pump. The reaction was continued for 3 hours, and a uniform polymer was still not obtained.

The temperature was raised to 290° C., the reaction temperature was above the melting point of the raw polymer, and a homogeneous system was formed after 30 minutes of reaction, and then the product was discharged after reacting under vacuum for 15 minutes to obtain a PA66 with a melting point of 260° C.

This example shows that if the reaction is carried out below the melting point of the polymer, even if the time of dispersion and reaction is increased to 3 hours, a uniform polymer cannot be obtained, but when the temperature of dispersion and reaction rises above the melting point of the raw polymer, the reaction can be completed in 45 minutes and obtains a uniform polymer product. Therefore, it is necessary that the temperature of the system exceeds the melting point of the raw polymer during the dispersion and reaction.

Example 15

By weight, the raw materials comprise 16.6 parts of isophthalic acid and 17.2 parts of hexamethylene diamine as polymeric monomers, and 31.0 parts of PA6I resin, wherein, the PA6I resin is an amorphous polymer with no melting point and only a glass transition temperature of 130° C.

Polymerization method: the formula amounts of 310 g PA6I resin and 166 g terephthalic acid were added into an internal mixer together, and mixed at 300° C. for 15 minutes. After cooling, the melted and dispersed product was added into an anticorrosive autoclave made of stainless steel and equipped with a condensing device. The temperature was raised to 280° C. to melt the product, and 172 g of hexamethylene diamine was added, dispersed and reacted at 300° C. for 1 hour. The reaction was then carried out under the conditions of 310° C. and 0.02 Mpa for 15 minutes. The temperature was raised to 330° C. and the product was discharged to obtain a polyamide PA6T resin which is amorphous material, with a glass transition temperature of 130° C. During the cooling process of the material, it was found that when the material gradually cooled to around 200 degrees Celsius, the system had begun to solidify and could not be stirred.

Example 16

By weight, the raw materials comprise 16.6 parts of isophthalic acid and 17.2 parts of hexamethylene diamine as polymeric monomers, and 31.0 parts of PA6I resin, wherein, the PA6I resin is an amorphous polymer with no melting point and only a glass transition temperature of 130° C.

Polymerization method: the formula amounts of 310 g PA6I resin and 166 g terephthalic acid were added into an internal mixer together, and the mixing was started at 200° C. The internal mixer was found to be overloaded and unable to operate. Until the temperature reached 265° C., the materials can be mixed well, indicating that in order to apply the method of the present invention to prepare polyamide products, for amorphous polymer raw materials, the required temperature not only needs to be higher than the glass transition temperature of the amorphous polymer, but also needs to reach the temperature at which the materials can undergo melt processing.

After cooling the mixed materials, the melted and dispersed product was added into an anticorrosive autoclave made of stainless steel and equipped with a condensing device. The temperature was raised to 280° C. to melt the product, and 172 g of hexamethylene diamine was added, dispersed and reacted at 300° C. for 1 hour. The reaction was then carried out under the conditions of 310° C. and 0.02 Mpa for 15 minutes. The temperature was raised to 330° C. and the product was discharged to obtain a polyamide PA6T resin which is amorphous material, with a glass transition temperature of 121° C.

Comparing Examples 15 and 16, the difference between the glass transition temperatures of the final products is nearly 10° C. only because of the temperature difference of the dispersion and mixing, indicating that the high reaction and dispersion temperature can make the product have better uniformity.

The conventional polycondensation production process of polyamide resin needs to prepare nylon salt first in order to solve the problem of monomer dispersibility. In this process, a large amount of water or organic solvents is consumed, and a certain amount of water is introduced as a dispersing agent during the polymerization process. In the polymerization process, the water needs to be heated to above 200° C. along with the reactants. This process not only produces waste water that needs to be treated, but also consumes an equivalent amount of energy additionally. The present invention may not require the process of preparing nylon salt in water or alcohol solution, saves a lot of water resources and energy, is a new and environmental-friendly process, has higher production efficiency than the conventional melting process in which acid is added first, and the product of the present invention has better temperature resistance. In addition, the method of the present invention can easily introduce various monomers to prepare copolymerized nylon, and adjust the performance of the product in a wide range.

When necessary, one or more additives required for polyamide synthesis can be added to the preparation method of the present invention, such as conventional catalysts, antioxidants, lubricants, or molecular weight regulators, etc., or the polymerization reaction can be completed directly without additives. The preparation method of the present invention is suitable for the synthesis of various polyamide resins, and is not limited to the types listed in the examples, and has a wide range of applications.

The above-mentioned examples only show the specific embodiments of the present invention, and the description of these examples is specific and detailed, but it should be understood that the examples are not limiting the patent scope of the present invention. It should be pointed out that for those of ordinary skill in the art, without departing from the concept of the present invention, several modifications and improvements can be made, and these all fall within the protection scope of the present invention.

The invention claimed is:
1. A method for preparing polyamide resin, wherein the raw materials comprise by weight 5-60 parts of dibasic acid and 3-50 parts of diamine as polymeric monomers, and by weight 10-90 parts of polyamide as a reactive dispersion system, reactively dispersing the polymeric monomers into the reactive dispersion system in a molten state, and performing a polymerization reaction to obtain the polymer product,
   wherein in the step of dispersing the polymeric monomers, the highest temperature reached by the materials is higher than the melting point of crystalline polyamide or the glass transition temperature of amorphous polyamide, so that the polyamide can be melted,
   wherein the reactive dispersion system is selected from at least one of aliphatic polyamide, polyamide containing aromatic monomer, polyamide containing ether bond and polyamide containing ester bond,
   wherein the diamine is selected from at least one of aliphatic diamine comprising 2-20 carbon atoms and aromatic diamine,
   wherein a molar proportion of aromatic dibasic acid contained in the dibasic acid monomer is not less than 20%, and
   wherein the dibasic acid, diamine, and polyamide are not combined before the polyamide is in the molten state when the melting points of the monomer raw materials are lower than the melting point of the polyamide raw material.

2. The method for preparing polyamide resin according to claim 1, wherein the process of reacting acid and amine in the monomers to form a salt and the process of dehydration polymerization are carried out in the reactive dispersion system in the molten state.

3. The method for preparing polyamide resin according to claim 1, wherein the highest temperature reached by the materials is higher than the melting point of the crystalline polyamide by 20° C. or more.

4. The method for preparing polyamide resin according to claim 3, wherein the melting point of the polyamide product is higher than 230° C.

5. The method for preparing polyamide resin according to claim 1, wherein the molar ratio of the monomeric dibasic acid to the monomeric diamine is 0.4-2:1.

6. The method for preparing polyamide resin according to claim 1, wherein in the step of dispersing the polymeric monomers, the addition of the monomeric dibasic acid does not precede the addition of the monomeric diamine.

7. The method for preparing polyamide resin according to claim 1, wherein the proportion of the reactive dispersion system in the raw materials is not less than 10%.

* * * * *